United States Patent
Akagawa

(10) Patent No.: US 9,315,655 B2
(45) Date of Patent: Apr. 19, 2016

(54) FIBER REINFORCED RESIN MOLDING COMPOUND AND MANUFACTURING METHOD FOR FIBER REINFORCED RESIN MOLDED ARTICLE THEREFROM

(71) Applicant: OCV Intellectual Capital, LLC, Toledo, OH (US)

(72) Inventor: Mitsuru Akagawa, Ibaraki (JP)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/363,332

(22) PCT Filed: Dec. 6, 2012

(86) PCT No.: PCT/US2012/068132
§ 371 (c)(1),
(2) Date: Jun. 6, 2014

(87) PCT Pub. No.: WO2013/086109
PCT Pub. Date: Jun. 13, 2013

(65) Prior Publication Data
US 2014/0329962 A1 Nov. 6, 2014

Related U.S. Application Data

(60) Provisional application No. 61/568,485, filed on Dec. 8, 2011, provisional application No. 61/596,326, filed on Feb. 8, 2012.

(51) Int. Cl.
| | |
|---|---|
| C08K 7/14 | (2006.01) |
| C08K 9/10 | (2006.01) |
| C08K 7/02 | (2006.01) |
| C08J 3/24 | (2006.01) |
| C08J 5/04 | (2006.01) |
| C08K 7/06 | (2006.01) |
| C08K 5/00 | (2006.01) |
| C08K 5/14 | (2006.01) |

(52) U.S. Cl.
CPC . *C08K 7/14* (2013.01); *C08J 3/241* (2013.01); *C08J 3/243* (2013.01); *C08J 5/04* (2013.01); *C08J 5/042* (2013.01); *C08J 5/043* (2013.01); *C08K 7/02* (2013.01); *C08K 7/06* (2013.01); *C08J 2333/06* (2013.01); *C08J 2367/06* (2013.01); *C08K 5/0025* (2013.01); *C08K 5/14* (2013.01); *C08K 9/10* (2013.01)

(58) Field of Classification Search
CPC ............... C08K 7/02; C08K 7/14; C08K 9/10
USPC ........................................................ 523/211
See application file for complete search history.

(56) References Cited

U.S. PATENT DOCUMENTS

| | | | |
|---|---|---|---|
| 3,142,666 A * | 7/1964 | de S. Deex et al. | ............. 526/64 |
| 3,395,105 A | 7/1968 | Washburn et al. | |
| 3,892,581 A | 7/1975 | Burgman et al. | |
| 4,080,238 A | 3/1978 | Wolinski et al. | |
| 4,154,774 A | 5/1979 | Hinterwaldner | |
| 4,303,736 A | 12/1981 | Torobin | |
| 4,362,566 A | 12/1982 | Hinterwaldner | |
| 4,428,983 A | 1/1984 | Nehen et al. | |
| 4,528,354 A | 7/1985 | McDougal | |
| 4,547,429 A | 10/1985 | Greiner et al. | |
| 4,622,267 A | 11/1986 | Riecke | |
| 4,808,639 A | 2/1989 | Chernack | |
| 4,876,296 A | 10/1989 | Miller et al. | |
| 5,084,494 A * | 1/1992 | McDougal | .................... 523/211 |
| 5,132,052 A | 7/1992 | Cobbledick et al. | |
| 5,357,008 A | 10/1994 | Tsai et al. | |
| 5,589,523 A | 12/1996 | Sawaoka et al. | |
| 6,555,602 B1 | 4/2003 | Harada et al. | |
| 7,959,838 B2 | 6/2011 | Takano et al. | |
| 8,715,543 B2 | 5/2014 | Akagawa | |
| 2004/0242346 A1 | 12/2004 | Ohama | |
| 2005/0058822 A1 | 3/2005 | Ittel | |
| 2007/0059526 A1 | 3/2007 | Lienert et al. | |
| 2014/0200315 A1 | 7/2014 | Akagawa | |

FOREIGN PATENT DOCUMENTS

| | | |
|---|---|---|
| EP | 287288 | 10/1988 |
| EP | 552976 | 7/1993 |
| GB | 1148635 | 4/1969 |
| GB | 1331286 | 1/1975 |
| GB | 1539809 | 2/1979 |
| JP | 73003238 | 1/1973 |
| JP | S48-007086 | 1/1973 |
| JP | 73019545 | 6/1973 |

(Continued)

OTHER PUBLICATIONS

Arnaud, et al., "A study of the polymerization of thermosetting polymers, and of a microencapsulated peroxide curing agent", 1998, Travaux Universitaires, Abstract only.

Summary of Product Features, Lipo Technologies, 9 pgs., available on the world-wide-web before Mar. 31, 2011.

Koishi, M. "Development and Application of Micro/Nanosystem Capsules and Fine Particles", CMC Publishing, New Materials and Advanced Materials Series, Table of Contents and pp. 94-98, publication page. 2009.

Koishi, M. et al., "Making + Using Microcapsules", Table of Contents, pp. 12-16, publication page, Oct. 18, 2005.

(Continued)

*Primary Examiner* — Vickey Nerangis
(74) *Attorney, Agent, or Firm* — Calfee, Halter & Griswold LLP

(57) ABSTRACT

A molding compound for manufacturing a fiber reinforced molded article is provided. The molding compound includes a resin composition and reinforcing fibers, with the resin composition containing an unsaturated polyester resin, a microencapsulated curing agent and a non-microencapsulated curing agent.

7 Claims, No Drawings

(56) References Cited

FOREIGN PATENT DOCUMENTS

| | | |
|---|---|---|
| JP | 52077003 | 6/1977 |
| JP | 56076432 | 6/1981 |
| JP | 57012017 | 1/1982 |
| JP | 59502018 | 12/1984 |
| JP | 60028449 | 2/1985 |
| JP | 60139331 | 7/1985 |
| JP | 63004919 | 1/1988 |
| JP | 1190399 | 7/1989 |
| JP | 1-282250 | 11/1989 |
| JP | 2052038 | 2/1990 |
| JP | 2058546 | 2/1990 |
| JP | 4175321 | 6/1992 |
| JP | 4372644 | 12/1992 |
| JP | 5078411 | 3/1993 |
| JP | 5138793 | 6/1993 |
| JP | 6009802 | 1/1994 |
| JP | 6100638 | 4/1994 |
| JP | 7-090907 | 4/1995 |
| JP | 7304968 | 11/1995 |
| JP | 8012861 | 1/1996 |
| JP | 8020708 | 1/1996 |
| JP | 8041174 | 2/1996 |
| JP | 9143244 | 6/1997 |
| JP | 11043618 | 2/1999 |
| JP | 2001-114757 | 4/2001 |
| JP | 2001-302760 | 10/2001 |
| JP | 2001-316451 | 11/2001 |
| JP | 2002524634 | 8/2002 |
| JP | 2003-253089 | 9/2003 |
| JP | 2004-075914 | 3/2004 |
| JP | 2005-226014 | 8/2005 |
| WO | 84/01919 | 5/1984 |
| WO | 93/15131 | 8/1993 |
| WO | 02/16482 | 2/2002 |
| WO | 03/086611 | 10/2003 |
| WO | 2011/073111 | 6/2011 |

OTHER PUBLICATIONS

Derwent Abstract, Microcapsules encapuslating oil-soluable organic peroxide, Feb. 21, 1990, JPO, JP 02052038A, p. 1-3.
Sakurai, Akio, Presentation of Research, Investigation of Microcapsules, pp. 313-317, vol. 60, No. 8, The Japan Reinforced Plastics Society in Aug. 2014.
Office action from Japanese Application No. 2014-502836 dated Dec. 14, 2015.
Office action from U.S. Appl. No. 14/213,239 dated Feb. 18, 2016.

* cited by examiner

FIBER REINFORCED RESIN MOLDING COMPOUND AND MANUFACTURING METHOD FOR FIBER REINFORCED RESIN MOLDED ARTICLE THEREFROM

RELATED APPLICATIONS

The present application is the U.S. national phase entry of PCT/US12/68132, filed on Dec. 5, 2012 which claims priority/benefit of the U.S. provisional patent application having Ser. No. 61/568,485 and filed on Dec. 8, 2011, and the U.S. provisional patent application having Ser. No. 61/596,326 and filed on Feb. 8, 2012, the entire disclosures of which are fully incorporated herein by reference.

FIELD

The general inventive concepts relate to fiber reinforced resin molding compounds and methods of manufacturing fiber reinforced resin molded articles therefrom.

BACKGROUND

Sheet molding compounds ("SMC"), bulk molding compounds ("BMC"), and thick molding compounds ("TMC") are fiber reinforced thermosetting resin molding compositions (sometimes referred to hereinafter as "compounds" in accordance with customary practice in this field) which are widely used in industrial molding processes such as compression molding, etc. Such fiber reinforced thermosetting resin molding compounds typically comprise a curable polymer resin and a curing agent capable of causing the resin to cure when the molding compound is heated or otherwise processed to activate the curing agent. These conventional compounds, however, encounter problems when used for molding articles having a thickness of 5 mm or more. The problems can include, for example, relatively long curing times, insufficient curing, and/or poor appearance of the resulting molded article. Accordingly, there is a need for fiber reinforced resin molding compounds that overcome or mitigate one or more of these problems, and/or any other problems, of the conventional compounds.

SUMMARY

The general inventive concepts relate to and contemplate reinforced resin molding compounds and methods of manufacturing fiber reinforced resin molded articles therefrom.

The general inventive concepts are applicable to fiber reinforced resin molding compounds, such as SMC, BMC, TMC, etc.

In one exemplary embodiment of the general inventive concepts, a molding compound comprising a resin composition and reinforcing fibers is provided. The resin composition contains an unsaturated polyester resin, a microencapsulated curing agent, and a non-microencapsulated curing agent.

In one exemplary embodiment of the general inventive concepts, the microencapsulated curing agent is a thermal responsive microencapsulated curing agent.

In one exemplary embodiment of the general inventive concepts, the non-microencapsulated curing agent has a lower activity compared with the microencapsulated curing agent.

In one exemplary embodiment of the general inventive concepts, the microencapsulated curing agent contains an organic peroxide having a one minute half-life temperature of 115° C. to 140° C., and the non-microencapsulated curing agent contains an organic peroxide having a one minute half-life temperature of 130° C. to 170° C.

In one exemplary embodiment of the general inventive concepts, the microencapsulated curing agent contains an organic peroxide having a one minute half-life temperature of 120° C. to 130° C., and the non-microencapsulated curing agent contains an organic peroxide having a one minute half-life temperature of 140° C. to 160° C.

In one exemplary embodiment of the general inventive concepts, the resin composition contains the microencapsulated curing agent and the non-microencapsulated curing agent in the ratio of from 0.5 to 5 parts per hundred parts resin by weight as the net amount of sum of all organic peroxides.

In one exemplary embodiment of the general inventive concepts, the resin composition contains the microencapsulated curing agent and the non-microencapsulated curing agent in the ratio of from 0.2 to 2 parts by weight to 1 part by weight, respectively, as the net amount of organic peroxide contained in each curing agent.

In one exemplary embodiment of the general inventive concepts, the resin composition further contains at least one additive selected from the group consisting of a low-shrinkage agent, a filler, a thickener, an anti-crack agent, an anti-separation agent, a mold release agent, and an inhibitor.

In one exemplary embodiment of the general inventive concepts, a manufacturing method for a fiber reinforced resin molded article comprises molding a molding compound by compression molding, wherein the molding compound comprises a resin composition and reinforcing fibers. The resin composition contains an unsaturated polyester resin, a microencapsulated curing agent, and a non-microencapsulated curing agent.

In one exemplary embodiment of the general inventive concepts, the microencapsulated curing agent of the molding compound used in the manufacturing method is a thermal responsive microencapsulated curing agent.

In one exemplary embodiment of the general inventive concepts, the non-microencapsulated curing agent of the molding compound used in the manufacturing method has a lower activity compared with the microencapsulated curing agent. In one exemplary embodiment of the general inventive concepts, the microencapsulated curing agent contains an organic peroxide having a one minute half-life temperature of 115° C. to 140° C., and the non-microencapsulated curing agent contains an organic peroxide having a one minute half-life temperature of 130° C. to 170° C. In one exemplary embodiment of the general inventive concepts, the microencapsulated curing agent contains an organic peroxide having a one minute half-life temperature of 120° C. to 130° C., and the non-microencapsulated curing agent contains an organic peroxide having a one minute half-life temperature of 140° C. to 160° C.

In one exemplary embodiment of the general inventive concepts, the resin composition of the molding compound used in the manufacturing method contains the microencapsulated curing agent and the non-microencapsulated curing agent in the ratio of from 0.5 to 5 parts per hundred parts resin by weight as the net amount of sum of all organic peroxides.

In one exemplary embodiment of the general inventive concepts, the resin composition of the molding compound used in the manufacturing method contains the microencapsulated curing agent and the non-micro encapsulated curing agent in the ratio of from 0.2 to 2 parts by weight to 1 part by weight, respectively, as the net amount of organic peroxide contained in each curing agent.

In one exemplary embodiment of the general inventive concepts, the resin composition of the molding compound used in the manufacturing method further contains at least one additive selected from the group consisting of a low-shrinkage agent, a filler, a thickener, an anti-crack agent, an anti-separation agent, a mold release agent, and an inhibitor.

The fiber reinforced resin molding compounds, according to the general inventive concepts, can exhibit a shelf life sufficient for practical use of the compounds after a reasonable storage period thereof.

The fiber reinforced resin molding compounds, according to the general inventive concepts, can retain flowability during the molding process such that the appearance of the resulting molded article is good.

The fiber reinforced resin molding compounds, according to the general inventive concepts, can be cured rapidly during the molding process, such that the overall molding time is shortened.

The fiber reinforced resin molding compounds, according to the general inventive concepts, can exhibit a high degree of cure, even for molded articles having a thickness in excess of 5 mm.

Numerous other aspects, advantages and/or features of the general inventive concepts, including equivalents thereof, will become more readily apparent from the following detailed description of exemplary embodiments and the claims presented herein.

DETAILED DESCRIPTION

The general inventive concepts relate to and contemplate fiber reinforced resin molding compounds and methods of manufacturing fiber reinforced resin molded articles therefrom. While the general inventive concepts are susceptible of embodiment in many different forms, there are described herein in detail specific embodiments thereof with the understanding that the present disclosure is to be considered as an exemplification of the principles of the general inventive concepts. Accordingly, the general inventive concepts are not intended to be limited to the specific embodiments described herein.

A molding compound for manufacturing a fiber reinforced molded article, according to one exemplary embodiment, comprises a resin composition and reinforcing fibers. The resin composition contains an unsaturated polyester resin, a microencapsulated curing agent and a non-microencapsulated curing agent.

In one exemplary embodiment, the resin composition contains the microencapsulated curing agent and the non-microencapsulated curing agent in the ratio of from 0.5 to 5 PHR (parts per hundred parts resin by weight) as the net amount of sum of all organic peroxides.

In one exemplary embodiment, the resin composition contains the microencapsulated curing agent and the non-microencapsulated curing agent in the ratio of from 0.2 to 2 parts by weight to 1 part by weight, respectively, as the net amount of organic peroxide contained in each curing agent.

Any microencapsulated curing agent providing the desired properties described herein can be used. For example, the microencapsulated curing agents described in the pending U.S. patent application having Ser. No. 13/436,161 and filed on Mar. 30, 2012 (published as U.S. 2012/0248639 on Oct. 4, 2012), the entire disclosure of which is incorporated herein by reference, can be used in this invention. As noted in the '639 publication, suitable curing agents can include, for example, dilauroyl peroxide, t-butyl peroxy-2-ethylhexanoate, 1,1,3,3-tetramethyl butylperoxy-2-ethylhexanoate, t-amyl-2-peroxy-2-ethylhexanoate and dibenzoyl peroxide.

The microencapsulated curing agents may be made by any known encapsulation technique. For example, the encapsulation techniques provided by Lyco Technologies, Inc. may suffice in forming the microencapsulated curing agents.

One exemplary encapsulation method, as described in the '639 publication, involves microencapsulating the curing agents in a polyurethane resin protective coating by means of interfacial polymerization. Interfacial polymerization is a process wherein a microcapsule wall of a polymer resin such as a polyamide, an epoxy resin, a polyurethane resin, a polyurea resin or the like is formed at an interface between two phases. The basic approach of the interfacial polymerization process is to (a) dissolve the peroxide curing agent and the isocyanate forming the polyurethane in an organic solvent which is essentially immiscible with water and a non-solvent for the polyol and optional polyamine forming the polyurethane, (b) emulsify the organic solution so formed in an aqueous phase by vigorous mixing, and then (c) add the polyol and optional polyamine to the emulsion so formed with continuous mixing to cause the polyurethane to form at the interface of the emulsified particles.

Forming microcapsules by interfacial polymerization is well-known and described in a number of publications. For example, such techniques are described in Masumi, et al., CREATION AND USE OF MICROCAPSULES, "1-3 Manufacturing Method and Use of Microcapsules," Page 12-15, © 2005 by Kogyo Chosa Kai K.K. (ISBN4-7693-4194-6 C3058). Such techniques are also described in Mitsuyuki et al., APPLICATION AND DEVELOPMENT OF MICRO/NANO SYSTEM CAPSULE AND FINE PARTICLES, "4-3 Manufacturing method of Thermal Responsive Microcapsules," Page 95-96, 2003 by K.K. CMC Shuppan (ISBN978-4-7813-0047-4 C3043).

In one exemplary embodiment, a thermal responsive microencapsulated curing agent is preferably used as the microencapsulated curing agent. When the thermal responsive microencapsulated curing agent is heated to a specific temperature that is required to practice a heat-press molding method, organic peroxide contained therein is emitted from the microcapsule.

In one exemplary embodiment, the microencapsulated curing agent desirably contains organic peroxide having a one minute half-life temperature of 115° C. to 140° C., and more desirably 120° C. to 130° C. As a result, the resin composition of the molding compound is rapidly cured during the molding process, so molding time is shortened.

Any non-microencapsulated curing agent providing the desired properties described herein can be used. For example, the non-microencapsulated curing agent can be a curing agent that is normally used for a conventional fiber reinforced resin molding compound, such as SMC. The non-microencapsulated curing agent can be a liquid, powder or particle.

In one exemplary embodiment, the non-microencapsulated curing agent has a lower activity compared with the microencapsulated curing agent. As a result, a problem of a shortened shelf life of the molding compound is prevented.

In one exemplary embodiment, for the compatibility of activity of the curing agent with sufficient shelf life of the molding compound, the non-microencapsulated curing agent desirably contains organic peroxide having a one minute half-life temperature of 130° C. to 170° C., and more desirably 140° C. to 160° C. As these non-microencapsulated curing agents, 1,1-di(t-hexylperoxy)cyclohexane (one minute half-life temperature: 149° C.), t-Amyl peroxy isopropyl carbonate (one minute half-life temperature: 153° C.), t-butyl peroxy isopropyl monocarbonate (one minute half-life temperature: 159° C.), t-butyl peroxy benzoate (one minute half-life temperature: 169° C.) or a mixture of at least two organic peroxides selected from above can, for example, be used.

By combining the microencapsulated curing agent and the non-microencapsulated curing agent, sufficient activity of the curing agents is obtained, and flowability of the molding compound can be retained during the molding process. As a result, even in a case where a molding time of a thick molded article is short, a sufficient degree of cure can be obtained, and the appearance of the resulting molded article is good.

In one exemplary embodiment, the total amount of the microencapsulated curing agent and the non-microencapsulated curing agent contained in the unsaturated polyester resin composition should be sufficient, so that the net amount of sum of all organic peroxides present is about 0.5 to 5 PHR, more typically 0.8 to 4 PHR, or even 0.9 to 3 PHR. PHR means "parts per hundred parts resin by weight," namely a ratio of the additive to the resin ingredients of 100 parts by weight. In this unit, the resin ingredients are the sum of the unsaturated polyester resin and the low shrinkage additive.

In one exemplary embodiment, for the compatibility of activity of the curing agent with flowability of the molding compound, the ratio of the microencapsulated curing agent to the non-microencapsulated curing agent preferably is 0.2 to 2 parts by weight to 1 part by weight, and more preferably is 0.3 to 1.5 parts by weight to 1 part by weight. This ratio is expressed by the net amount of organic peroxide contained in each curing agent.

As noted above, the molding compound for manufacturing a fiber reinforced molded article, according to one exemplary embodiment, comprises a resin composition and reinforcing fibers. The resin composition contains an unsaturated polyester resin, the above mentioned microencapsulated curing agent, and the non-microencapsulated curing agent. And the resin composition can further contain at least one additive selected from the group consisting of a low-shrinkage agent, a filler, a thickener, an anti-crack agent, an anti-separation agent, a mold release agent, and an inhibitor. The unsaturated polyester resin and/or these additives can be the same as the resins and additives that are used in conventional molding compounds such as SMC.

In one exemplary embodiment, the reinforcing fibers are glass fibers. In one exemplary embodiment, the glass fibers have a filament diameter of 5-20 μm. Such glass fibers can be continuous or chopped, and if chopped desirably have a length of 20-100 mm. In addition, such filaments can also be formed into strands. In one exemplary embodiment, the reinforcing fibers are strands having a yarn count (weight per unit length) of 50-5,000 gm/km. In one exemplary embodiment, the reinforcing fibers are strands having a bundling number of 50-200 filaments per strand. If desired, such glass fibers, and/or the strands and yarns made therefrom, can be coated with a suitable sizing agent containing a silane coupling agent, the sizing agent also optionally containing a film-forming agent such as a polyurethane or polyvinyl acetate resin, and other conventional ingredients such as cationic and nonionic surfactants and the like. In one exemplary embodiment, a sizing amount of 0.2-2 wt. %, based on the weight of the glass fiber being coated, is applied.

In one exemplary embodiment, the reinforcing fibers are non-glass fibers, such as carbon fibers.

Any amount of the reinforcing fibers can be included in the thermosetting resin molding compounds. In one exemplary embodiment, a reinforcing fiber concentration on the order of 10-60 wt. %, and more preferably 20-50 wt. %, based on the weight of the thermosetting composition as a whole, is used.

The molding compounds of the general inventive concepts can have a form such as sheet molding compounds ("SMC"), bulk molding compounds ("BMC"), or thick molding compounds ("TMC").

In one exemplary embodiment, a manufacturing method for a fiber-reinforced resin molded article involves these molding compounds being molded to obtain the molded article, such as by a compression molding method.

Tables 1 and 2 illustrate various working examples of molding compounds that comport with the general inventive concepts described herein. In particular, resin compositions having formulations described in Table 2 were prepared, and curing agents mentioned in Table 1 were used in these compositions.

TABLE 1

| | Type and Composition of Curing Agent | | |
|---|---|---|---|
| Name of curing agent | CA-1 | CA-C | CA-D |
| Type | microencapsulated | non-microencapsulated | non-microencapsulated |
| Form | dried powder | liquid | liquid |
| Shell material | polyurethane resin | — | — |
| Peroxide | t-Amyl peroxy 2-ethylhexanoate | t-Amyl peroxy 2-ethylhexanoate | mixture mainly containing t-Butyl peroxy isopropyl monocarbonate |
| One minute half life temperature (° C.) | 127 | 127 | 156 |
| Producing method of microcapsule | interfacial polymerization | — | — |
| Peroxide content (wt %) | 34.5 | 50 | 92 |
| Average particle diameter (μm) | 90 | — | — |

TABLE 2

| | Resin Composition-1 | Resin Composition-2 | Resin Composition-3 | Resin Composition-V | Resin Composition-W | Resin Composition-X | Resin Composition-Y | Resin Composition-Z |
|---|---|---|---|---|---|---|---|---|
| | | | | Formulation of Resin Composition Unit: wt % | | | | |
| | | | | Name of composition | | | | |
| Name of microencapsulated curing agent | CA-1 | CA-1 | CA-1 | CA-1 | CA-1 | CA-1 | — | — |
| Name of non-microencapsulated curing agent | CA-D | CA-D | CA-D | CA-C | — | — | CA-D | CA-C |
| Unsaturated polyester resin | 32.96 | 33.03 | 32.80 | 32.96 | 32.92 | 32.56 | 33.07 | 33.04 |
| Low shrinkage additive (polystyrene) | 10.99 | 11.01 | 10.93 | 10.99 | 10.97 | 10.85 | 11.02 | 11.01 |
| Pigment (gray color) | 2.07 | 2.07 | 2.06 | 2.07 | 2.06 | 2.04 | 2.07 | 2.07 |
| Microencapsulated curing agent | 0.44 | 0.44 | 0.88 | 0.44 | 1.10 | 2.17 | 0.00 | 0.00 |
| Non-microencapsulated curing agent | 0.44 | 0.22 | 0.44 | 0.44 | 0.00 | 0.00 | 0.44 | 0.75 |
| Inhibitor (MEK solution of p-benzoquinone, 5 wt % conc.) | 0.11 | 0.11 | 0.11 | 0.11 | 0.00 | 0.00 | 0.22 | 0.00 |
| Mold releasing agent (zinc stearate) | 2.20 | 2.20 | 2.19 | 2.20 | 2.19 | 2.17 | 2.20 | 2.20 |
| Anti-crack agent (polyethylene) | 1.76 | 1.76 | 1.75 | 1.76 | 1.76 | 1.74 | 1.76 | 1.76 |
| Filler (calcium carbonate) | 48.32 | 48.45 | 48.13 | 48.32 | 48.29 | 47.77 | 48.51 | 48.46 |
| Anti-separation agent | 0.18 | 0.18 | 0.18 | 0.18 | 0.18 | 0.17 | 0.18 | 0.18 |
| Thickener (magnesium oxide) | 0.53 | 0.53 | 0.53 | 0.53 | 0.53 | 0.53 | 0.53 | 0.53 |
| Total | 100.00 | 100.00 | 100.00 | 100.00 | 100.00 | 100.00 | 100.00 | 100.00 |
| Ratio of total net amount of peroxide/PHR | 1.25 | 0.79 | 1.60 | 0.84 | 0.87 | 1.73 | 0.91 | 0.86 |
| Ratio of non-MC to MC in net amount of peroxide/PBW | 1:0.38 | 1:0.75 | 1:0.75 | 1:0.68 | — | — | 1:0 | 1:0 |

Table 3 relates to evaluating the samples for shelf life. The resin compositions were individually put in steel can with a cap, and they were aged under atmosphere at a temperature of 40° C. over two days. Then, they were kept under room temperature. After a specific amount of time had passed, the condition of each resin composition was visually inspected and evaluated by criteria noted in Table 3. The results obtained are set forth in the following Table 3.

Accordingly, it is understood that the exemplary molding compounds of the general inventive concepts have sufficient shelf life as lengthy as a conventional molding compound using Resin Composition-Y, because inventive Resin Composition-1 has sufficient flowability even after 101 days passed. Furthermore, it is understood that the shelf life of the molding compounds using Resin Composition-V or Resin Composition-Z, which contain a non-microencapsulated curing agent with high activity, is so short as to be impractical.

TABLE 3

| | Resin Composition-1 | Resin Composition-V | Resin Composition-W | Resin Composition-X | Resin Composition-Y | Resin Composition-Z |
|---|---|---|---|---|---|---|
| | | | Evaluation for shelf life of resin compositions | | | |
| | | | Name of composition | | | |
| Name of microencapsulated curing agent | CA-1 | CA-1 | CA-1 | CA-1 | — | — |
| Name of non-microencapsulated curing agent | CA-D | CA-C | — | — | CA-D | CA-C |
| Days passed after preparation of resin composition | | | Condition of resin compositions | | | |
| 1 | OK | OK | OK | OK | OK | OK |
| 2 | OK | OK | OK | OK | OK | NG |

TABLE 3-continued

Evaluation for shelf life of resin compositions
Name of composition

| | Resin Composition-1 | Resin Composition-V | Resin Composition-W | Resin Composition-X | Resin Composition-Y | Resin Composition-Z |
|---|---|---|---|---|---|---|
| 7 | OK | NG | OK | OK | OK | NG |
| 27 | OK | NG | OK | OK | OK | NG |
| 55 | OK | NG | OK | OK | OK | NG |
| 101 | OK | NG | OK | OK | OK | NG |

"OK": having flowability sufficient to mold as molding compound
"NG": hardened or gelled as high viscosity as can not be used Table 4 relates to evaluating the samples for moldability (curing speed) in the context of a SMC. In particular, Resin Composition-1 was formulated into a sheet molding compound (SMC-1) by combining 66 wt. % of a chopped glass fiber strand having a length of about 25 mm, the chopped glass fiber strand being made from a glass fiber strand having a linear density of 75 gm/km, a bundling number of 150 filaments per strand and a filament diameter of 16 μm, the glass fiber strand being sized with 0.95 wt. % of a sizing agent containing a silane coupling agent, a polyurethane resin and a polyvinyl acetate resin. In the same way, Resin Composition-V to Resin Composition-Z were formulated into a sheet molding compound (SMC-V to SMC-Z) by combining 66 wt. % of each molding resin with 34 wt. % of the same chopped glass fiber strand used to make sheet molding compound SMC-1.

Each of the sheet molding compounds so made was then molded into a flat plate having a thickness of 3 mm or 5 mm by means of a heat-press molding machine in which an upper platen heated to a temperature of 140° C. and a lower platen heated to 145° C. were compressed together at a cylinder pressure of 180 kg/cm$^2$. After a specific amount of time under these conditions, the platens were opened, and the molded plates were visually inspected for surface appearance and condition of cure. Then, according to the criteria noted in Table 4, surface appearance and condition of cure were evaluated. The results obtained are set forth in the following Table 4. In the case where the flat plate having a thickness of 3 mm is molded at a time of 60 seconds, a curing condition of SMC other than SMC-W containing only a small amount of the microencapsulated curing agent and SMC-Y as conventional SMC is sufficient.

It takes a time of 130 seconds, as a standard molding time, to make the flat plate having a thickness of 5 mm from SMC-Y, which is a conventional SMC. In contrast, only SMC-1 as an exemplary inventive SMC was cured sufficiently in a time shorter than this standard molding time, such as 90, 70, and 60 seconds. This evidences a more rapid cure of SMC. In SMC-V, namely SMC containing the microencapsulated curing agent and the non-microencapsulated curing agent, both having high activity, its cure condition was poor.

TABLE 4

Evaluation of SMC
Name of sheet molding compound

| | SMC-1 | SMC-V | SMC-W | SMC-X | SMC-Y | SMC-Z |
|---|---|---|---|---|---|---|
| Name of microencapsulated curing agent | CA-1 | CA-1 | CA-1 | CA-1 | — | — |
| Name of non-microencapsulated curing agent | CA-D | CA-C | — | — | CA-D | CA-C |
| Name of resin composition | Resin Composition-1 | Resin Composition-V | Resin Composition-W | Resin Composition-X | Resin Composition-Y | Resin Composition-Z |
| Glass fiber content (wt. %) | 34 | 34 | 34 | 34 | 34 | 34 |
| Compressing time (sec.) | \multicolumn{6}{Test results of molding flat plates having thickness of 3 mm} |
| 60 | cured | cured | not cured | cured | not cured | cured |
| Compressing time (sec.) | \multicolumn{6}{Test results of molding flat plates having thickness of 5 mm} |
| 130*[1] | cured | (not tested) | not cured | (not tested) | cured | (not tested) |
| 90 | cured | not cured | not cured | not cured | not cured | not cured |
| 70 | cured | not cured | (not tested) | not cured | not cured | cured, but poor smoothness |
| 60 | cured | (not tested) | (not tested) | (not tested) | not cured | (not tested) |

*[1] standard molding time of conventional SMC such as SMC Y
"cured": SMC has sufficiently cured in whole, and molded flat plate has good surface appearance
"not cured": SMC has not cured in its inside, or delaminated portion such as air gap has remained in molded flat plate Table 5 relates to evaluating the SMC samples for cure time. In particular, Cure Time of SMC was measured by the method using the equipment having the name of "Cure Tool." Test conditions and the results obtained are set forth in the following Table 5. Cure Time means the required time until reaching the highest temperature from start of heating. As noted in Table 5, the Cure Time of SMC-1, SMC-2 and SMC-3, as inventive SMCs, are shorter than SMC-Y, as a conventional SMC.

TABLE 5

Evaluation of SMC <Cure Time>
Name of sheet molding compound

|  | SMC-1 | SMC-2 | SMC-3 | SMC-V | SMC-W | SMC-X | SMC-Y | SMC-Z |
|---|---|---|---|---|---|---|---|---|
| Name of microencapsulated curing agent | CA-1 | CA-1 | CA-1 | CA-1 | CA-1 | CA-1 | — | — |
| Name of non-microencapsulated curing agent | CA-D | CA-D | CA-D | CA-C | — | — | CA-D | CA-C |
| Name of resin composition | Resin Composition-1 | Resin Composition-1 | Resin Composition-1 | Resin Composition-V | Resin Composition-W | Resin Composition-X | Resin Composition-Y | Resin Composition-Z |
| Glass fiber content (wt. %) | 34 | 34 | 34 | 34 | 34 | 34 | 34 | 34 |
| Cure time* (sec.) | 89.8 | 93.0 | 85.5 | 70.0 | 80.0 | 68.7 | 109.0 | 63.0 |

Test method: using test equipment having name of "Cure Tool"

Test condition: platen temperature (upper/lower) 145° C./145° C., pressure: 125 kgf/cm$^2$, mold size: 70 cm suquare, charge amount of SMC: 65 grams

*Cure time: the required time until reaching the highest temperature from start of heating Table 6 relates to evaluating the SMC samples for specular glossiness. In particular, specular glossiness of molded articles made from the above-mentioned SMCs was measured by the method according to JIS Z8741, on an incident angle of 60 degrees. The results obtained are set forth in the following Table 6. In a conventional SMC, namely SMC-Y, the glossiness of its molded article tends to decline with shortening of compressing time. On the other hand, all of the molded articles made from SMC-1, as an inventive SMC, have glossiness equivalent to the molded article made from conventional SMC by the standard molding time.

TABLE 6

Evaluation of SMC <Specular glossiness>
Name of sheet molding compound

|  | SMC-1 | SMC-V | SMC-W | SMC-X | SMC-Y | SMC-Z |
|---|---|---|---|---|---|---|
| Name of microencapsulated curing agent | CA-1 | CA-1 | CA-1 | CA-1 | — | — |
| Name of non-microencapsulated curing agent | CA-D | CA-C | — | — | CA-D | CA-C |
| Name of resin composition | Resin Composition-1 | Resin Composition-V | Resin Composition-W | Resin Composition-X | Resin Composition-Y | Resin Composition-Z |
| Glass fiber content (wt. %) | 34 | 34 | 34 | 34 | 34 | 34 |
| Compressing time (sec.) | Test results of molding flat plates having thickness of 5 mm | | | | | |
| 130*[1] | 76.3 | (not tested) | 51.6 | (not tested) | 75.1 | (not tested) |
| 90 | 75.7 | 57.2 | 41.0 | 51.8 | 60.9 | 48.9 |
| 70 | 61.4 | 55.7 | (not tested) | 51.4 | 51.1 | 39.8 |
| 60 | 64.4 | (not tested) | (not tested) | (not tested) | 45.9 | (not tested) |

*[1]standard molding time of conventional SMC such as SMC Y

Test method: JIS Z8741, "Gs(60°)" as a measurement on incident angle of 60 degrees Tables 7 and 8 relate to evaluating the SMC samples for bending strength and bending modulus, respectively. In particular, bending strength and bending modulus of molded articles made from SMC-1 and SMC-4, as exemplary inventive SMC, and SMC-Y, as a conventional SMC, were measured. Test conditions and the results obtained are set forth in the following Table 7 and Table 8.

In SMC-1, both properties tend to decrease with shortening of compressing time. This tendency was resolved by SMC-4 having a relatively high glass fiber content.

TABLE 7

Evaluation of SMC <Bending strengths> Unit: MPa

| Name of sheet molding compound | SMC - 1 | SMC - 4 | SMC - Y |
|---|---|---|---|
| Name of microencapsulated curing agent | CA-1 | CA-1 | — |
| Name of non-microencapsulated curing agent | CA-D | CA-D | CA-D |
| Name of resin composition | Resin Composition - 1 | Resin Composition - 1 | Resin Composition - Y |
| Glass fiber content (wt. %) | 34 | 36 | 34 |
| Compressing time (sec.) | Test results of molding flat plates having thickness of 5 mm | | |
| 130 *[1] | 155.4 | (not tested) | 155.2 |
| 90 | 139.3 | 151.1 | 134.0 |
| 70 | 144.1 | 168.6 | (not tested) |
| 60 | (not tested) | 169.2 | (not tested) |

*[1] standard molding time of conventional SMC such as SMC-Y

Test condition

Specimen size: width 10 mm, length 110 mm, thickness 5 mm

Head speed: 3 mm/min.

Span: 80 mm

TABLE 8

Evaluation of SMC <Bending modulus> Unit: GPa

| Name of sheet molding compound | SMC - 1 | SMC - 4 | SMC - Y |
|---|---|---|---|
| Name of microencapsulated curing agent | CA-1 | CA-1 | — |
| Name of non-microencapsulated curing agent | CA-D | CA-D | CA-D |
| Name of resin composition | Resin Composition - 1 | Resin Composition - 1 | Resin Composition - Y |
| Glass fiber content (wt. %) | 34 | 36 | 34 |
| Compressing time (sec.) | Test results of molding flat plates having thickness of 5 mm | | |
| 130 *[1] | 11.2 | (not tested) | 10.5 |
| 90 | 14.1 | 10.8 | 9.6 |
| 70 | 9.7 | 11.2 | (not tested) |
| 60 | (not tested) | 11.7 | (not tested) |

*[1] standard molding time of conventional SMC such as SMC-Y

Test condition

Specimen size: width 10 mm, length 110 mm, thickness 5 mm

Head speed: 3 mm/min

Span: 80 mm

In view of the above, the inventive fiber reinforced resin molding compounds have been shown to provide superior properties over those presented by conventional fiber reinforced resin molding compounds. For example, SMC-1, as an exemplary inventive molding compound, obtained excellent results in both shelf life and curing condition.

The general inventive concepts further contemplate manufacturing methods for producing fiber reinforced resin molded articles, the manufacturing methods using any of the fiber reinforced resin molding compounds described or suggested herein.

The above description of specific embodiments has been given by way of example. From the disclosure given, those skilled in the art will not only understand the general inventive concepts and their attendant advantages, but will also find apparent various changes and modifications to the compounds and methods disclosed. It is sought, therefore, to cover all such changes and modifications as fall within the spirit and scope of the general inventive concepts, as described and claimed herein, and any equivalents thereof.

The invention claimed is:

1. A molding compound comprising a resin composition and reinforcing fibers, wherein the resin composition contains an unsaturated polyester resin, a microencapsulated curing agent and a non-microencapsulated curing agent, wherein the non-microencapsulated curing agent has a longer curing time compared with the microencapsulated curing agent, wherein the microencapsulated curing agent contains an organic peroxide having a one minute half-life temperature of 115° C. to 130° C.; and wherein the non-microencapsulated curing agent contains an organic peroxide having a one minute half-life temperature of 140° C. to 170° C.

2. The molding compound of claim 1, wherein the microencapsulated curing agent is a thermal responsive microencapsulated curing agent.

3. The molding compound of claim 1, wherein the resin composition contains the microencapsulated curing agent and the non-microencapsulated curing agent in the ratio of from 0.5 to 5 parts per hundred parts resin by weight as the net amount of sum of all organic peroxides.

4. The molding compound of claim 1, wherein the resin composition contains the microencapsulated curing agent and the non-microencapsulated curing agent in the ratio of from 0.2 to 2 parts by weight to 1 part by weight, respectively, as the net amount of organic peroxide contained in each curing agent.

5. The molding compound of claim 1, wherein the resin composition further contains at least one additive selected from the group consisting of a low-shrinkage agent, a filler, a thickener, an anti-crack agent, an anti-separation agent, a mold release agent, and an inhibitor.

6. The molding compound of claim 1, wherein said non-microencapsulated curing agent is selected from the group consisting of: 1,1-di(t-hexylperoxy)cyclohexane, t-Amyl peroxy isopropyl carbonate, t-butyl peroxy isopropyl monocarbonate, t-butyl peroxy benzoate; and a mixture thereof.

7. A manufacturing method for a fiber reinforced resin molded article comprising molding the molding compound according to claim 1 by compression molding.

* * * * *